United States Patent [19]
Brühl et al.

[11] Patent Number: 5,819,384
[45] Date of Patent: Oct. 13, 1998

[54] HEAT EXCHANGER TUBING PRODUCTION PLANT

[75] Inventors: Fritz Brühl, Krefeld, Germany; Hendrik Rombaut, Destelbergen, Belgium

[73] Assignee: Mannesmann Aktiengesellschaft, Düsseldorf, Germany

[21] Appl. No.: 615,264

[22] PCT Filed: Sep. 9, 1994

[86] PCT No.: PCT/DE94/01081

§ 371 Date: Mar. 11, 1996

§ 102(e) Date: Mar. 11, 1996

[87] PCT Pub. No.: WO95/07156

PCT Pub. Date: Mar. 16, 1995

[30] Foreign Application Priority Data

Sep. 9, 1903 [DE] Germany .......................... 43 30 957.7

[51] Int. Cl.[6] .................................................. B23P 23/00
[52] U.S. Cl. .................................... 29/33 D; 29/890.046; 219/107
[58] Field of Search .................................... 29/33 F, 33 G, 29/33.7, 890.046, 564.8, 726, 33 D; 219/62, 107; 228/4

[56] References Cited

U.S. PATENT DOCUMENTS

| | | | |
|---|---|---|---|
| 3,578,165 | 5/1971 | Boose | 219/107 |
| 3,652,820 | 3/1972 | Boose | 219/107 |
| 3,670,945 | 6/1972 | Furstenberger et al. | 228/4 |
| 4,079,611 | 3/1978 | Osterkorn et al. | 29/890.046 |
| 4,259,771 | 4/1981 | Ogata | 29/33 F |

FOREIGN PATENT DOCUMENTS

| | | | |
|---|---|---|---|
| 157442 | 12/1980 | Japan | 29/726 |
| 1690885 | 11/1991 | U.S.S.R. | 29/890.046 |
| 1752468 | 8/1992 | U.S.S.R. | 29/890.046 |
| 2250456 | 6/1992 | United Kingdom | 29/890.046 |

*Primary Examiner*—William R. Briggs
*Attorney, Agent, or Firm*—Cohen, Pontani, Lieberman, Pavane

[57] ABSTRACT

A plant for producing metal heat exchanger tubes with spiral heat exchanger ribs secured to the exterior surface from smooth tubes and strip-form flat material for the ribs. In order to allow ribbed tubes to be economically produced at any desired location, the main plant units needed to produce the ribbed tubes, such as a rotating device, strip conveyor and joining device, are installed in one or more mobile container-type modules in production order.

19 Claims, 3 Drawing Sheets

HEAT EXCHANGER TUBING PRODUCTION PLANT

BACKGROUND OF THE INVENTION

1. Field of the Invention

The invention relates to a plant for producing metal heat exchanger tubes.

2. Description of the Prior Art

Tubes of this type, which have spiral heat exchanger ribs attached to their exterior surface, are also known as ribbed tubes. For use in steam generators, these ribbed tubes are made of boiler steel. The ribs are made from a section of flat steel (sheet strip or drawn section) and are welded to the tube surface continuously or by segment (e.g. EP 0 031 422 B1). The invention refers primarily, but is not exclusively limited, to this type of ribbed-tube production. The invention also includes plants for producing ribbed tubes from other metals, such as copper or aluminum, whereby, furthermore, different materials may be used for the tubes and the ribs, respectively (e.g., aluminum ribs on steel tubes). Furthermore, other types of attachment techniques (e.g., soldering, shrink connection, rolling the rib base into the tube also be used (e.g., DE-OS 23 60 477).

In the plants normally used today to produce ribbed tubes from steel materials, the ribs are joined to the surface of the smooth tubes using the HF-welding technique. The frequency normally used for the welding is in the approximate range of 400–500 kHz. In these plants, each smooth tube supplied via a smooth tube bed must be placed into spiral motion relative to the flat material used to form the ribs, so that the flat material lies closely and in loops that project radially outward around the smooth tube, which has a clean metal surface. This often requires considerable forming work to be carried out, which means that the drive must be equipped with suitably high driving power. In addition, because of the feared notch effect, no striae may be permitted to develop on the tube surface as the result of gripping tools used to produce a spiral motion, particularly in the case of tubes intended for boiler construction.

For these reasons, ribbed-tube production plants today are normally equipped with a rotating chuck, similar to a rotating bench, which securely grasps the smooth tube at one end and can be placed into rotation. In order to produce the spiral movement, a linear movement is superimposed on the rotational motion in the direction of the tube axis (longitudinal axis). For this purpose, the rotating chuck is mounted in a carriage-type holding frame, which can be motively moved on the machine bed. The length of the machine bed corresponds to the maximum tube length to be produced. As a rule, the rotational motion and the linear motion can be steplessly adjusted relative to one another, so that the ribbed tubes can be produced with any desired division (distance between two adjacent ribs). The conveyor mechanism for the flat material (strip conveyor) of the ribs is stationary in the operating state, as is the welding unit with the welding electrodes, while the rotating device (rotating chuck with carriages) moves linearly along with each respective tube. It is also possible to select a kinematically-reversed arrangement, in which the rotating chuck remains stationary while the strip conveyor is mounted on a carriage that can move along the machine bed (e.g., EP 0 259 607 B1 or EP 0 303 074 A2).

Ribbed tubes for steam generators are usually 14–18 m or even 22 m in length. This leads to correspondingly long and heavy machine beds and thus to correspondingly high investment costs for plants of this type.

From U.S. Pat. No. 3,047,712 it is known, for an HF-welding technique for ribbed-tube production, to produce the spiral movement of the tube by means of a group of driven rolls distributed around the tube circumference and set with their rotational axes at a slant to the tube axis. In this case, the slope of the spiral movement depends on the relationship between the roll speed and the slant angle. However, due to the large deformation forces that arise when rib material is wound around the tube, this process has not proved practical, at least when steel materials are used, because the drive forces cannot be transmitted adequately and because impermissibly heavy striae form on the tube surface.

It is furthermore known to use, instead of the usual driving device with a movable rotating chuck, a rotating device equipped with a stationary rotatable cage through which the tube is conveyed. The active principle is shown in the diagram in FIG. 2. In this drawing, the tube to be rotated is indicated by 14 and the turnable cage by 16. Inside the cage 16, there are two groups of adjustable rolls 17 and 18, which are distributed around the tube 14 and can be adjusted in the radial direction in order to attain sufficient pressure force on the tube surface. The rotational axes of the rolls 17, 18 lie, respectively, on a plane vertical to the tube axis. The rolls 17 are not driven, but can turn freely with the tube moving 14 to the left. The only function of the rolls 17 is to transmit the rotational movement of the cage 16 around the tube axis to the tube 14 without noticeable slip. In contrast, the rolls 18 are driven (e.g., by electric motor) and cause the linear movement of the tube 14. The rotational movement of the cage 16 and the speed of the rolls 18 can be set relative to one another as desired, e.g., by means of a mechanical (stepless gear) or an electric coupling device, so that the spiral movement of the tube 14 can be set at any desired slope.

The demand for boiler tubes in the form of ribbed tubes is subject to extreme fluctuation, because the need for such tubes is often linked to large-scale projects (e.g., construction of new power plants). For example, in a single country, a new power plant might be constructed once every 4–6 years, requiring a quantity of ribbed tubes that represents the approximate output of a ribbed-tube plant over a period of 3–4 months. Under these conditions, it is obvious that investments in new plants in this country would not be justified, for reasons of cost. On the other hand, developing countries and threshold countries, in particular, endeavor in the framework of large-scale projects to manufacture the greatest possible share of the needed parts domestically, in order to promote their own economic development.

SUMMARY OF THE INVENTION

The object of the invention is to further develop a generic plant in such a way that it is possible to produce ribbed tubes economically at any desired location.

The basic idea of the invention is to design a plant for producing ribbed tubes in the form of mobile, i.e., easily transportable, partial modules, which can be assembled into a complete functional plant inexpensively and in an extremely short period of time (e.g., 2–3 days), without placing greater demands on the existing infrastructure at the production site. The main aggregates of the plant unconditionally necessary to produce the ribbed tubes (rotating device, strip conveyor and joining device) are installed in one or more mobile container-type modules in the required production order. Advantageously, the core unit with the main aggregates (rotating device, strip conveyor and joining device) is housed in a single containertype housing (e.g., the size of a standard 6 m container). Doing this would scarcely be feasible, were the current standard principle of a linearly-moved rotating chuck for the rotating device to be used in a plant to produce tubes with welded-on ribs, simply because of the great weight and size of the machine bed; the result, at the least, would be drastic limitations in producible tube lengths, because the largest standard containers are only about 12 meters long. However, by selecting a rotating device that causes the spiral motion by means of rolls which grip onto the tube from the outside while remaining stationary in the direction of the tube axis, it is possible to attain a very short plant structure in the axial direction, without placing any limits on the producible tube lengths.

The invention is described below in greater detail in reference to the example shown in the drawings.

DETAILED DESCRIPTION OF THE PREFERRED EMBODIMENT

Figure 1:
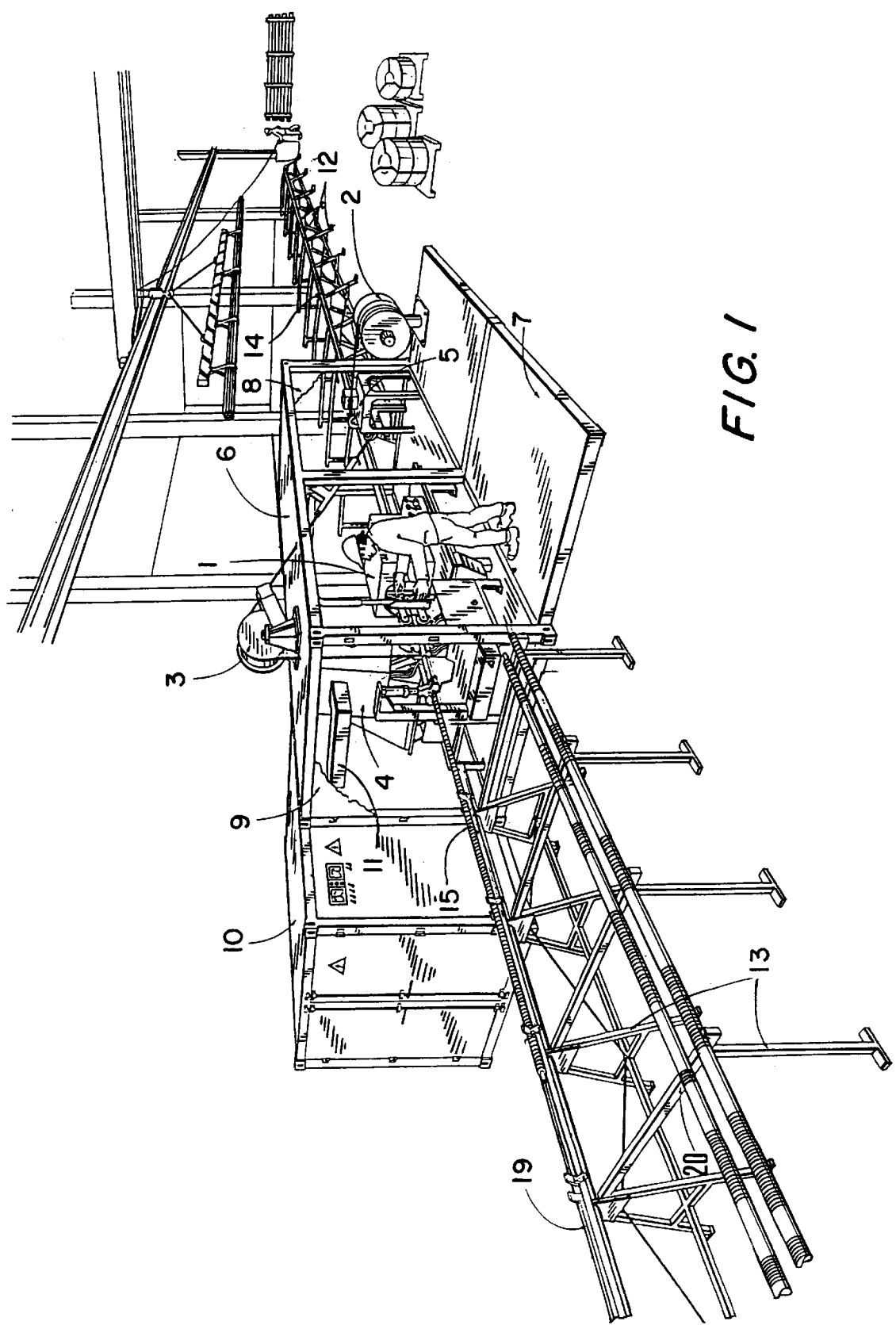
FIG. 1 is a perspective view of a plant according to the present invention.
Figure 2:
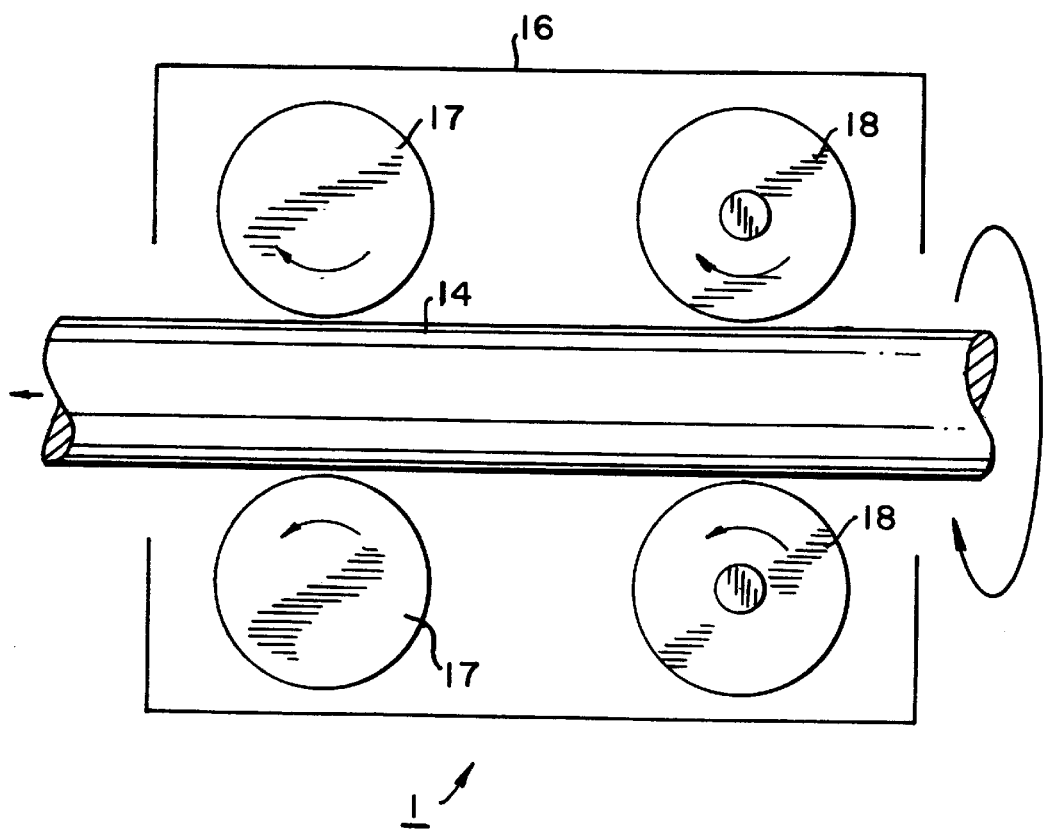
FIG. 2 is a schematic diagram of a rotating device.

In the center of the plant according to the invention illustrated in FIG. 1, there is a container-type housing 6, which is attuned, in respect to its portability, to the individual aggregates contained therein, taking into account the fact that at least the walls of the two end faces 8, 9 and the wall 7 on one of the two broad sides can be removed or at least opened widely. The bottom of the container 6 substitutes for a machine foundation and constitutes an accessible working area for the operating personnel. In the example shown, this is also true of the unfolding wall 7, which forms a level surface with the container bottom. It is therefore sufficient to level the ground for the working area of the plant in a simple manner. As essential individual aggregates, a rotating device 1 and a joining device designed as an HR-welding unit 4 for joining the ribs to the tube, are attached to the bottom of the container, one behind the other in a line. Instead of an HF-welding device 4, it is possible to provide a different welding device or, for example, a rolling device that fits the ribs securely to the tube surface, particularly for ribs of aluminum or copper. A soldering device could also be used here. In the case of ribbed tubes of steel, however, the HF-welding device is clearly preferred, because it permits reliable control of the welding process and a comparatively low energy transfer into the heat exchanger tube. The rotating device 1 is arranged in a stationary manner and is advantageously designed in accordance with the principle described above, as shown in FIG. 2. It should also be noted that the number of the rolls 17 and 18 is at least three and that all roll materials, in particular, wear-resistant iron materials and, as applicable, shape-stable hard plastics, can be used. The flat material for the ribs can be conveyed from the side, for example, at an obtuse angle (often in the vicinity of 90°) relative to the tube axis. However, it is preferable that the flat material be conveyed from above, as shown in FIG. 1, because this interferes the least with the working area in the vicinity of the HF-welding device 4. It is especially advantageous for the deflector roll 3 to be attached to a swing-out flap mechanism (not shown) on the roof surface of the container 6 above the joining zone where the ribs are joined to the tube 14, so that during transport the deflector roll 3 is protected in the interior of the container 6 and need only be swung outward when the plant is put into operation. The stockpile of flat material for the ribs is brought to the plant in the form of narrow strip rolls or, advantageously, in the form of cross-wound coils, and is unwound via the coiling device 2. Compared to narrow strip rolls, cross-wound coils have the great advantage that considerably larger quantities (c. 1–2 t) can be provided per coil, and as a result the need for connection to an almost used-up coil during the production process occurs only about once per shift. For this purpose, a simple butt-welding machine 5 is used, which is also securely installed on the bottom of the container 6, but can naturally also be set up separately. Using the larger cross-wound coils provides the great advantage of allowing the otherwise usual expensive and failure-prone strip storage units for bridging the coil change periods without shutdown to be completely omitted, because the downtime can be simply tolerated due to the rarity of coil changes. This is especially true when the coiling device 2, as shown, is designed as a swingable double coiler. This allows a reserve coil to be loaded even as the working coil is being unwound. When the working coil is used up, the double coiler is turned around a vertical axis by 180°, so that the reserve coil moves into the working position. FIG. 1 shows that the coiling device is advantageously mounted permanently on the unfoldable wall 7 of the long side of the container 6.

The power supply for the HF-welding machine 4 with the required control and regulating devices is housed in a separate container 10 and thus represents a unit that is similarly easy to transport and can be set up as needed along the second long side of the container 6. The container 6 has connection devices (e.g., in the area of the cable duct 11), via which the required line connections can be established. As shown in the drawing, the switches and control devices for setting the welding machine and the drives of the mechanism are naturally arranged in their own work area of the container 6. Along with the hook-ups for the HF power supply and the other power supply, connection devices for auxiliary materials (e.g., cooling water or pressurized air) are also provided on the container 6.

The core plant units housed in the container 6 are supplied, for example, with smooth boiler tubes 14 to be provided with ribs, via a smooth tube bed 12, which is attached in a freestanding manner at the rear open end face 8 of the container 6. In the same manner, a ribbed tube bed 13 for accepting the finished ribbed tubes 15 is attached at the front end face 9. The smooth tube bed 12 and the ribbed tube bed 13 are advantageously manufactured as light-weight structures (e.g., welded from square tubes) and have essentially the same design. In what follows, therefore, only the ribbed tube bed will be discussed in greater detail, by way of example. The ribbed tube bed is formed of a plurality of basic stand-type elements arranged at a distance to one another and connected to one another rigidly but detachably. On one longitudinal side, these basic elements carry a tube channel 19, which holds the ribbed tube 15 moving spirally out of the container 6. This tube channel 19 can be equipped, for example, with plastic plates. On an opposite longitudinal side, lateral carrying arms 20 are attached, which run roughly horizontally or slightly flatly inclined, so that the finished ribbed tubes 15 can roll against a stop at the end of the carrying arm 20. In the case of the smooth tube bed 12, such stops can be omitted, because, due to the reversed transport direction, the inclination of the carrying arms can also be advantageously reversed. Advantageously, the two tube beds 12, 13 have no rotating parts, apart from a simple lever mechanism as an ejector or a destacking device, and are therefore not only economical to produce but also low-maintenance and repairable, if necessary, with very simple resources.

Figure 3:
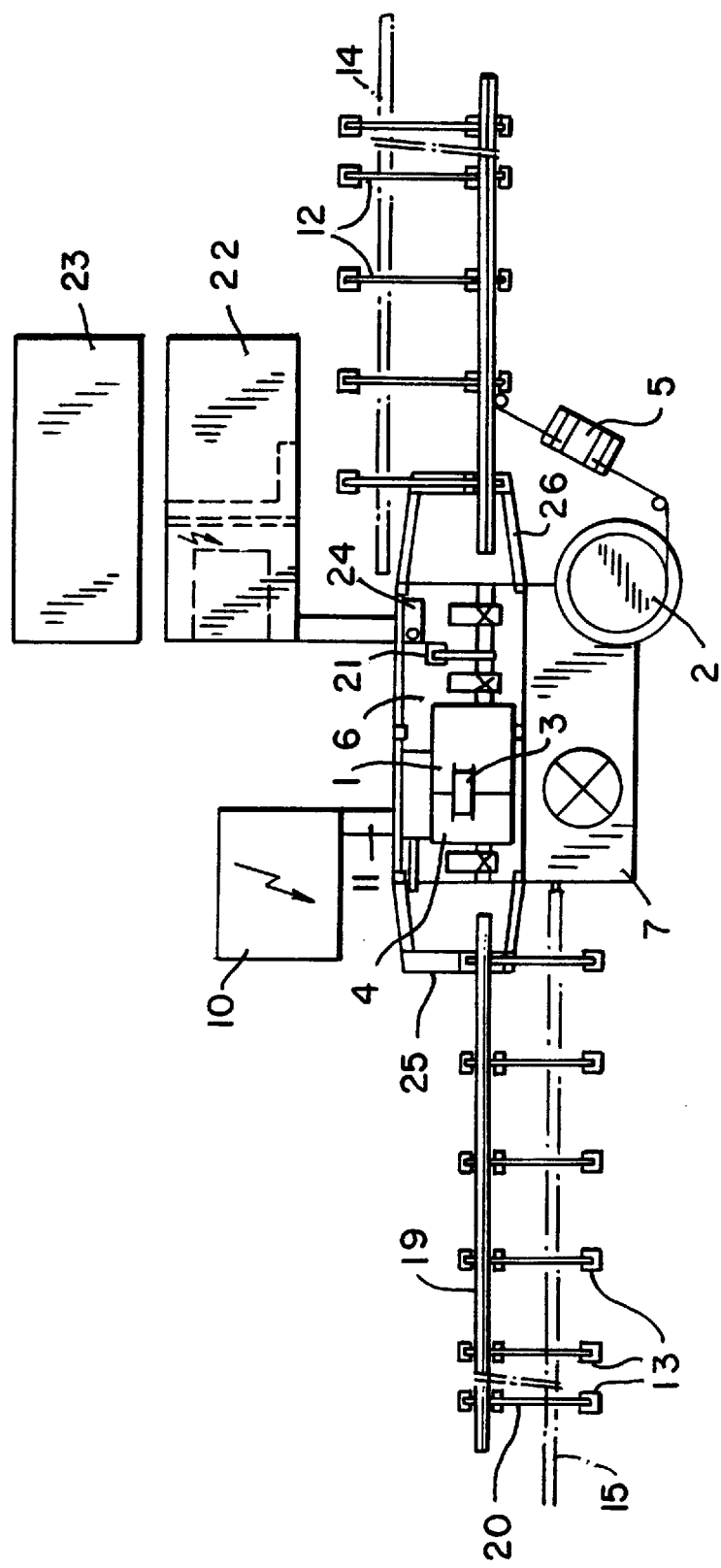
FIG. 3 schematically illustrates a modified embodiment of a plant according to the invention.

In a basic schematic diagram, FIG. 3 shows a plant according to the invention, which agrees for the most part with that shown in FIG. 1. Parts with the same function have the same reference numbers and do not need to be explained again. In contrast to FIG. 1, the butt-welding device 5 is located outside of the container 6, and a strip storage device for the steel strip to be used can be arranged by means of deflector roll systems along the tube supply channel of the smooth tube bed 12. In the areas of the two respective end faces 8, 9 of the container 6, the unfoldable or screw-on alignment frames 25, 26 are mounted, which make it possible to simply align two tube beds 12, 13 quickly and accurately in the direction of the tube axis of the tubes passing through. The reference number 24 indicates an optional device for supplying pressurized air.

Because, as a rule, the smooth tubes 14 cannot be delivered with clean metal surface, it is advantageous, to also provide the container 6 with a simple cleaning device (e.g., a strip abradant device) 21. Advantageously, this is set up in the vicinity of the end face 8, so that the entering tubes 14 can move past the cleaning device in a spiral fashion and thus can easily be cleaned on their entire outer surface.

If an inadequate infrastructure exists at the site where the plant according to the invention is to be set up, the plant can be supplemented by additional units in module-type containers. This is true, in particular, for the supply of cooling water. The processing equipment needed for this can be housed in a separate container and connected to the container 6 in a very simple manner via the existing hook-up devices. If there is a shortage of fresh water, this unit can also be designed as a cooling aggregate with a closed cooling water circuit.

In a corresponding manner, additional containers 22, 23 can be provided, which contain quality-control devices and/or packing and shipping equipment and/or maintenance equipment and/or office and administrative equipment for the organizational management of the plant. It is also possible to provide a container-type module in which a cutting device is installed, with which the strip for the ribs can be cut in the crosswise direction at short distances in order to manufacture tubes with serrated fins. Such a module can, for example, be set up in the rear part on the container 6 (in front of the deflector roll 3).

The plant according to the invention makes it possible to carry out ribbed-tube production at any desired location in a very short time without great investment expense and without extensive preparatory work. This plant is simply constructed and easy to transport, because it can be easily loaded into standard containers and because the main units are designed with the outer dimensions of such containers in mind. The plant is largely operable with semi-skilled personnel and requires only a minimum number of skilled specialized employees. Nonetheless, production quality equal to that of normal industrial manufacturing can be achieved. Another essential advantage is the minimizing of transport costs for the ribbed tubes, which have roughly twice the diameter of the smooth tubes and thus occupy a substantially larger volume of space. In addition, transport damages are avoided when ribbed-tube production takes place at the site where the tubes are to be further processed (e.g., at a boilermaker or power plant construction site). For the first time, the invention makes it possible to economically produce ribbed tubes on site even in countries with only a "sporadic" market for such tubes, whereby any available domestic products can easily be used as production materials (smooth tubes, rib material). The use of such a plant is also advantageous at the site of an established ribbed-tube manufacturer, in order, for example, to meet short-term peaks in demand which would not justify the expense of building a conventional permanent plant. In this way, problems that otherwise arise again and again in respect to tight delivery deadlines can be easily solved. Such a mobile plant can, for example, be leased and made available for production in a very short period of time, without high-risk investment expenses having to be incurred.

We claim:

1. A plant for producing metal heat exchanger tubes with spiral heat exchanger ribs attached to an external surface of the tubes from smooth tubes and strip-form flat material, comprising:

rotating means for producing a relative spiral movement between a smooth tube and the flat material, the rotating means being stationary and including a plurality of rolls that are radially adjustable relative to an axis of the smooth tube and impart a spiral movement to the smooth tube;

smooth tube bed means for conveying the smooth tube to the rotating means;

strip conveyor means arranged at an obtuse angle to the tube axis for conveying the flat material to the smooth tube;

joining means for permanently joining the flat material onto the smooth tube to form a ribbed tube;

ribbed tube bed means for carrying away the ribbed tube from the joining means; and at least one container-like module, the rotating means, the strip conveyor means and the joining means being mounted in the at least one container-like module in an order required for production of the ribbed tube, the at least one module being a housing having a frame, two opposed, openable end face walls and two longitudinal side walls that run between the end face walls, the rotating means, the strip conveyor means and the joining means being arranged in the container-like housing, the smooth tube bed means and the ribbed tube bed means being configured to attach respectively to the housing frame when the end face walls are opened, at least one of the longitudinal side walls of the housing being configured to open; and further comprising connecting means for supplying and discharging driving energy for the plant.

2. A plant as defined in claim 1, wherein the joining means includes an HF-welding device.

3. A plant as defined in claim 2, including a second container-like module arranged at a longitudinal side wall of the housing, and further comprising a power supply for the HF-welding device, the power supply being arranged in the second container-like module, the connecting means being configured to connect the power supply to the welding device.

4. A plant as defined in claim 1, wherein the at least one longitudinal wall is configured to unfold outwardly from the frame so that the wall forms an even, accessible working area with a bottom of the housing.

5. A plant as defined in claim 4, wherein the strip conveyor means includes a coiling device attached to an interior side of the unfoldable longitudinal wall, and a deflector roll attached to a roof of the housing.

6. A plant as defined in claim 5, and further comprising a flap mechanism mounted to the roof so that the flap mechanism can be swung outward from the housing, the deflector roll being mounted to the flap mechanism so as to be movable between a first position at an interior side of the roof and a second position at an exterior side of the roof.

7. A plant as defined in claim 5, wherein the joining means includes a butt-welding device mounted in the housing for joining individual partial lengths of the flat material.

8. A plant as defined in claim 1, wherein the rotating means includes a cage rotatable around the tube axis, the rolls for producing the spiral movement of the smooth tube being mounted in the cage.

9. A plant as defined in claim 8, wherein the rolls include a first group of rolls provided in the cage so as to rotate freely about their respective rotational axes and to transmit only rotational movement of the cage to the smooth tube, and a second group of rolls arranged in the cage and motively driven in a sense of linear movement components of the spiral movement of the smooth tube, the speeds of the cage rotation and of the rolls of the second group of rolls being adjustable relative to one another in a stepless fashion.

10. A plant as defined in claim 1, and further comprising means for cleaning the surface of the smooth tube, the cleaning means being located in the housing near the end face which faces the smooth tube bed means.

11. A plant as defined in claim 1, wherein the ribbed tube bed means includes a plurality of like-constructed strand-type basic elements that are rigidly and detachably connected to one another, a tube channel located on a first longitudinal side of the connected basic elements, and laterally-extending carrying arms attached to the first longitudinal side so as to be inclined.

12. A plant as defined in claim 11, wherein the smooth tube bed means includes a plurality of like-constructed stand-type basic elements that are rigidly and detachably connected to one another, a tube channel located on a first longitudinal side of the connected basic elements, and laterally-extending carrying arms attached to the first longitudinal side so as to be inclined.

13. A plant as defined in claim 5, wherein the coiling device is a swingable double coiler for holding a working coil and a reserve coil.

14. A plant as defined in claim 1, including a further container-like module, and further comprising means for processing cooling water, the water processing means being provided in the further container-like module, and still further comprising means for connecting the water processing means to the housing.

15. A plant as defined in claim 1, and further comprising at least one of a cutting device for serrated fins, a power generator unit driven by an internal combustion engine, quality-control devices, packing and shipping devices, maintenance equipment, and office and administrative equipment, said at least one container-like module including containers for said at least one of a cutting device, a power generator unit, quality control devices, packing and shipping devices, maintenance equipment, and office and administrative equipment.

16. A plant as defined in claim 1, and further comprising means, provided on the two end faces of the housing, for exactly aligning at least one of the smooth tube bed means and the ribbed tube bed means in a forward-motion direction of the exchanger tubes through the plant.

17. A plant as defined in claim 16, wherein the aligning means includes an alignment frame that is mounted to the housing so as to be movable between a first, folded storage position and a second, unfolded operation position.

18. A plant as defined in claim 16, wherein the aligning means includes an alignment frame that is detachably mounted to the housing frame.

19. A plant as defined in claim 1, wherein the end face walls are removable.

\* \* \* \* \*